Aug. 18, 1953      E. PRICE      2,648,970
GAS TANK LOCK
Filed May 6, 1952
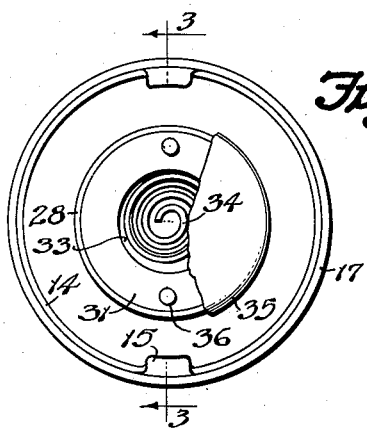
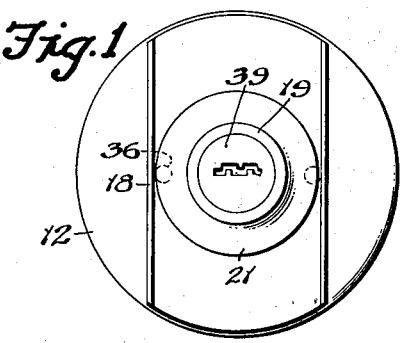
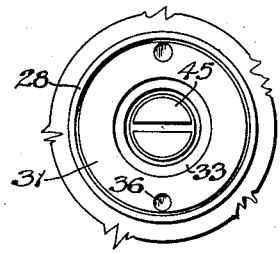
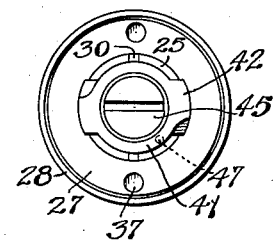
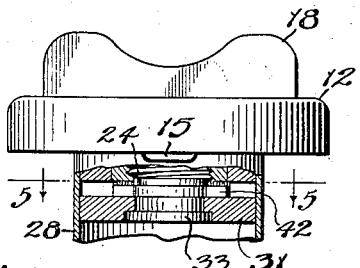
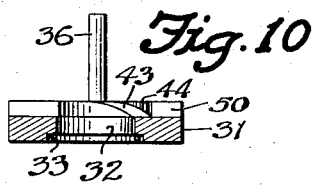
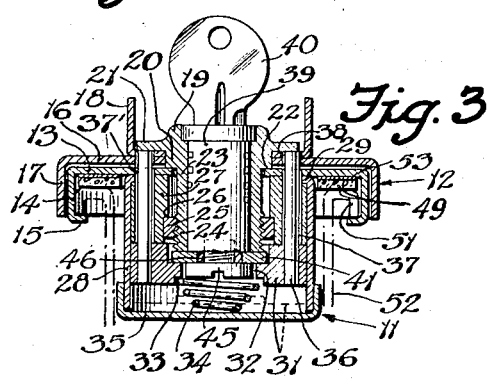
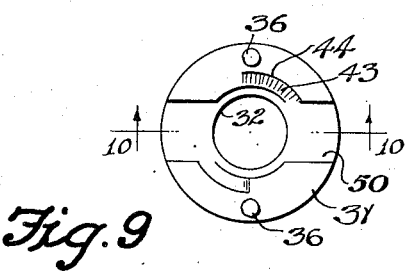
INVENTOR.
EMIL PRICE
BY Lynn H. Latta
ATTORNEY.

Patented Aug. 18, 1953

2,648,970

UNITED STATES PATENT OFFICE 2,648,970

GAS TANK LOCK

Emil Price, Los Angeles, Calif.

Application May 6, 1952, Serial No. 286,240

8 Claims. (Cl. 70—165)

This invention relates to locking cap for automobile fuel tanks. The general object of the invention is to provide an improved locking cap of the type in which an inner cap, adapted to interlock with an external flange on the filling tube of the gasoline tank, is covered by an outer cap which is freely rotatable when the device is locked, so as to make it impossible for the inner cap to be turned for removing it.

Other objects will become apparent in the ensuing specifications and appended drawings in which:

Fig. 1 is an outer end view of a locking cap embodying the invention;

Fig. 2 is an inner end view thereof, with a portion broken away;

Fig. 3 is an axial sectional view taken on the line 3—3 of Fig. 2;

Fig. 4 is a view partially in section and partially in side elevation;

Fig. 5 is a transverse sectional view taken on the line 5—5 of Fig. 4;

Fig. 6 is an inner end view with some of the parts removed;

Fig. 7 is an inner end view with additional parts removed;

Fig. 8 is an inner view of the lock tumbler assembly;

Fig. 9 is a detail view of the clutch ring; and

Fig. 10 is a sectional view of the clutch ring, taken on the line 10—10 of Fig. 9.

As an example of one form in which the invention may be embodied, I have shown in the drawings a locking cap embodying generally in an inner cap assembly 11 and an outer cap unit 12, the latter being normally rotatable with reference to the inner cap assembly, and covering the same so as to make it impossible to grasp the inner cap. In this manner, the inner cap is protected against unauthorized removal from the filling tube of a gasoline tank.

The inner cap assembly 11 comprises generally a cap member 13 having a peripheral flange 14 provided with diametrically opposed, radially inwardly projecting fingers 15 to engage beneath the outwardly projecting flange 51 of a conventional gasoline tank filling tube 52 (shown in phantom in Fig. 3) of the type employed for example on the Cadillac automobile (the only car in which the filling tube has an extremely rolled flange and a limited space in which to operate the cap). In applying the cap 13 to the filling tube, fingers 15 are passed through notches (not shown) in the tube flange 51 and the cap is then rotated to bring the fingers 15 into engagement with the underside of the flange. In order to remove it the cap must be rotated back to a position where the fingers are registered with the notches in the flange. The outer cap unit 12, by preventing access to the inner cap 13, constitutes the sole means for rotating the inner cap.

Outer cap unit 12 includes a top member 16, a peripheral flange 17, and a pair of ears 18 functioning as handle means for rotating the cap. Rotation is transmitted from outer cap unit 12 to inner cap assembly 11 through clutch mechanism which will be described hereinafter, said clutch mechanism being normally disengaged to establish the locked condition of the assembly. Flange 17 completely enclosed flange 14 of the inner cap 13, so as to make it impossible for the inner cap to be directly grasped in the fingers.

Inner cap assembly 11 includes, in addition to cap member 13, a lock cylinder 19 having a relatively thick outer portion 20 presenting a cylindrical lateral wall which is piloted in a central opening in disc member 16 of outer cap unit 12, so as to provide a bearing on which cap member 12 is rotatably mounted. An integral radial flange 21 projects outwardly from thick end portion 20 of the cylinder, to completely cover the clutch pins which will be hereinafter described. At the base of thick end portion 20 is a shoulder 22 which provides an end bearing for inner cap member 13. The central body portion 23 of cylinder 19, of smaller diameter than end portion 20, projects axially from shoulder 22 and extends through a central opening in cap 13. Cylinder body 23 has a threaded end portion 24, on which is threaded a nut 25. Nut 25 engages a shoulder 26 which defines the bottom of a counterbore in the inner end of a guide ring 27. Nut 25 (Fig. 8) has in its inner end a pair of diametrically opposed notches 30 adapted to receive a pair of prongs on a special tubular wrench which fits over the inner end of cylinder 19. Also forming a part of this fixed assembly is a cylindrical barrel 28, the outer end of which is provided with an inwardly turned flange 29 projecting into an annular groove in the outer end of guide ring 27. Flange 29 is clamped between a shoulder in the end of ring 27, defined by said groove, and the inner face of cap 13. Ring 27 is snugly fitted into barrel 28, as indicated in Fig. 3.

It will now be apparent that in the fixed cylinder and barrel assembly, just described, there is defined between cap 13 and flange 21 an annular groove in which the inner portion of outer cap unit 12 is rotatably mounted, except when the two cap units are clutched together by the clutch mechanism which will now be described.

Mounted for axially sliding movement within barrel 28 is a clutch ring 31 the periphery of which is in sliding bearing engagement with the inner wall of barrel 28. Clutch ring 31 has a central opening 32 terminating in a counter bore 33 in which is piloted the base portion of a conical spring 34. The apex of spring 34 bears against an end abutment cap 35 secured to the inner end of barrel 28 and enclosing the operating assembly therein. Spring 34 is under compression and urges the clutch ring 31 toward the guide ring 27, the movement of ring 31 in this direction being limited by engagement thereof against the inner end of guide ring 27 in the position shown in Fig. 3.

A pair of clutch pins 36 are fixed in clutch ring 31 at diametrically opposed points and are slidably extended through correspondingly positioned bores 37 in guide ring 27 and apertures 37' in inner cap 13. The outer ends of pins 36 are adapted to extend into apertures 38 in the inner portion of outer cap unit 12. As previously noted, flange 21 completely covers the outer end of clutch pins 36, to prevent the insertion of a sharp instrument in any unauthorized attempt to retract the pins from their clutching positions. It may now be noted that with the ends of the clutch pins 36 in apertures 38, cap units 12, 13 will be clutched together so that rotation may be transmitted from the former to the latter for removing the cap assembly from the gasoline tank filling tube.

For retracting the clutch pins so as to lock the assembly with outer cap unit 12 freely rotatable upon inner cap assembly 11, I provide the following lock and actuator mechanism: rotatably mounted within the cylinder 23 is a tumbler core 39, which has conventional locking tumblers engageable in appropriate notches within cylinder 23, for locking the tumbler core 39 against rotation. The insertion of a key 40 unlocks the core 39 to permit it to rotate. Attached to the inner end of tumbler core 39 is an actuator head 41 in the form of an annular disc having diametrically opposed, radially projecting actuator fingers 42 (Fig. 7). Fingers 42 operate against ramps 43 (Figs. 5, 9 and 10) formed in diametrically opposed recesses 44 in clutch ring 31. By rotating head 41 in a counterclockwise direction as viewed in Fig. 5, fingers 42 will ride up ramps 43 until they rest on the outer face of clutch ring 31. In doing so, they force the clutch ring 31 toward end cap 35, to the dotted line position shown in Fig. 3, thereby withdrawing clutch pins 36 from openings 38 and releasing the clutching connection between cap units 12, 13. Head 41 is secured to tumbler core 39 by a cap screw 45 the head of which bears against head 41 and the shank of which is extended through head 41 and threaded into the end of core 39. Core 39 has at its end a squared stem 46 (Fig. 5) which engages in a correspondingly shaped opening in head 41 to provide a driving connection between the core 39 and the head 41.

Rotation of head 41 is restricted to a 90° arc, by a pin 47 (Fig. 5) mounted in head 41 and projecting axially into a 90° notch 48 (Fig. 8) in the end of cylinder 23. In the position in which clutch ring 31 is retracted against guide ring 27, fingers 42 are received in a cross groove 50 in ring 31, as shown in Fig. 5.

An annular sealing gasket 49 is carried by a bronze spring collar 53 to provide a spring loading of the cap in locking engagement with flange 51. Gasket 49 functions to seal the cap to the end of the filling tube 52.

It will now be apparent that, by inserting key 40 into core 39 and rotating core 39 through a 90° arc of rotation, fingers 42 will be caused to travel from their positions disposed in cross groove 50 of ring 31 as shown in Fig. 5, counterclockwise as indicated by the arrow, to positions at right angles thereto, in which they rest against the outer surface of clutch ring 31, and that during such rotation, clutch ring 31 will be moved from the full line position of Fig. 3 to the dotted line position of that figure, withdrawing clutch pins 36 from their clutching engagement in openings 38 and rendering the outer cap unit 12 freely rotatable upon inner cap unit 13, thus locking the assembly against any possibility of removal from the filling tube of a gasoline tank. It is in this position that the locking tumblers engage in their respective notches in cylinder 23 and lock the core 39 against any possibility of rotation, after the key 40 has been removed. By reinserting the key, withdrawing the tumblers and rotating core 39 back to a position in which head fingers 42 have travelled back to the bottom of cross groove 50, the clutch ring 31 will be released for movement back to its full line position of Fig. 3 as soon as outer cap unit 12 has been rotated to bring the apertures 38 into registry with the ends of clutch pins 36 allowing the latter to move into the apertures 38 and clutch the two cap members together. The cap assembly may then be actuated to remove it from the filling tube of the gasoline tank.

Clutch pins 36 are constantly engaged in ports 37' of inner cap 13, the maximum travel of clutch ring 31 in its retracting movement being just sufficient to bring the ends of pins 36 flush with the outer face of cap 13. Thus, even though the frictional interengagement of cap 13, cylinder 19, flange 29 and guide ring 27 should be inadequate to prevent relative rotation between cap 13 and pins 36, such relative rotation will be positively prevented by the continual engagement of pins 36 in apertures 37'.

The invention is particularly characterized by the unique arrangement of clutch ring 31 with axially inclined camming ramps 43 cooperable with head 41 on the end of tumbler core 39 for withdrawing pins 36 from apertures 38, together with spring 34 acting between clutch ring 31 and end cap 35, for returning the clutch ring to clutching position when head 41 is rotated back to its normal position. This arrangement of parts makes possible the compact assembly within barrel 28 which in turn is small enough to be received inside filling tube 52. Also, in this respect, the invention provides a fully enclosed assembly of operating parts, sealed against dust, dirt and moisture and therefore resistant to deterioration. A particular feature of the arrangement which produces a compact assembly within a fairly narrow diameter, is the stacking of parts predominantly in axial succession, instead of spreading them out radially. The particular form of clutch ring 31 and camming head 41 is important in this connection.

I claim:

1. In a locking cap of the type described: an inner cap assembly including an inner cap having means operable, upon rotation thereof, to secure the same to a member to be capped; a cylindrical barrel secured to the inner side of said inner cap, coaxial therewith, said barrel having therein, a guide part provided with a bore extending therethrough, said bore being radially spaced from and parallel with the longitudinal axis of the guide part; a lock tumbler cylinder secured to said inner cap, radially inwardly of said guide part, extending into said barrel and having an outer end portion provided with a radial flange overlying the outer end of said bore; an outer cap enclosing the inner cap and having a central portion defining an opening receiving said outer end portion of the tumbler cylinder, said central portion being rotatably mounted between said inner cap and said flange; said caps having respective ports adapted to be registered with each other by relative rotation between the caps; a lock tumbler core rotatably mounted within said cylinder and having tumbler means coacting with said cylinder for locking the core to the cylinder; a head secured to the inner end of said core and having a radially projecting camming finger; a clutch part axially slidable in said barrel from a position abutting said guide part to a position axially separated therefrom; end abutment means carried by the inner end of said barrel; a spring interposed under load between said end abutment means and said clutch part and urging the latter toward abutment with said guide part; a clutch pin axially slidable in said bore, having an inner end secured to said clutch part and its outer end adapted to extend through said ports when the latter are registered, thereby to clutch said outer cap to said inner cap assembly; and a camming ramp at the inner margin of said clutch part, coacting with said finger to cause said clutch part to move away from said guide part when said tumbler core is rotated, thereby to withdraw said clutch pin from the port of said outer cap and thus free said outer cap for rotation relative to said inner cap.

2. In a locking cap of the type described: an inner cap assembly including an inner cap having means operable, upon rotation thereof, to secure the same to a member to be capped; a cylindrical barrel secured to the inner side of said inner cap, coaxial therewith; a tubular guide ring mounted in said barrel and provided with diametrically opposed bores parallel to the axis of said barrel; a lock tumbler cylinder disposed within said guide ring, said cylinder having an outer end portion secured to said inner cap and provided with a radial flange overlying the outer ends of said bores; an outer cap enclosing said inner cap and having a central portion defining an opening receiving said outer end portion of the tumbler cylinder, said central portion being rotatably mounted between said flange and said inner cap; said caps having respective pairs of ports adapted to be registered with each other by relative rotation between the caps, the ports of the inner cap registering with the outer ends of said bores; a lock tumbler core rotatably mounted within said cylinder and having tumbler means coacting with said cylinder for locking the core to the cylinder; a head secured to the inner end of said core and having diametrically opposed radially projecting camming fingers; a clutch ring axially slidable in said barrel from a position abutting said guide ring to a position axially separated therefrom; end abutment means secured to the inner end of said barrel; a spring interposed under load between said end abutment means and said clutch ring and urging the latter toward abutment with said guide ring; and a pair of clutch pins axially slidable in the respective bores, each pin having one end secured to said clutch ring and its other end constantly engaged in a respective port of said inner cap and adapted to extend through a corresponding port of the outer cap upon rotation of the latter to an unlocking position, thereby to clutch said outer cap to said inner cap assembly; and diametrically opposed camming ramps at the inner margin of said clutch ring, coacting with said camming fingers to cause said clutch ring to move away from said guide ring when said tumbler core is rotated, thereby to withdraw said clutch pin from the port of said outer cap and thus free said outer cap for rotation relative to said inner cap.

3. A locking cap as defined in claim 2, wherein said end abutment means comprises a cap sealed to the end of said barrel and cooperating with said barrel and inner cap to define a dust-sealed casing for the other parts of the device.

4. In a locking cap of the type described: an inner cap assembly including an inner cap having means operable, upon rotation thereof, to secure the same to a member to be capped; a cylindrical barrel secured to the inner side of inner cap, coaxial therewith; said barrel having therein, a guide part provided with a bore radially spaced from and parallel with the longitudinal axis of the guide part; an outer cap enclosing the inner cap and rotatably mounted thereon; said caps having respective ports adapted to be registered with each other by relative rotation therebetween; a lock tumbler cylinder secured to said inner cap and extending into said barrel radially inwardly of said guide part; a lock tumbler core rotatably mounted within and extending through said cylinder and having tumbler means coacting therewith for locking the core to the cylinder; a head secured to the inner end of said core and having radially projecting camming fingers; a clutch part axially slidable in said barrel from a position abutting said guide part to a position axially separated therefrom; end abutment means carried by the inner end of said barrel; a spring interposed under load between said end abutment means and said clutch part and urging the latter toward abutment with said guide part; a clutch pin axially slidable in said bore, having one end secured to said clutch part and its other end adapted to extend through said ports when the latter are registered, to clutch said outer cap to said inner cap assembly; and a camming ramp at the inner margin of said clutch part, coacting with said finger to cause said clutch part to move away from said guide part when said tumbler core is rotated, thereby to withdraw said clutch pin from the port of said outer cap and free said outer cap for rotation relative to said inner cap, thereby to withdraw said clutch pin from the port of said outer cap and thus free said outer cap for rotation relative to said inner cap.

5. In a locking cap of the type described: an inner cap assembly including an inner cap having means operable, upon rotation thereof, to secure the same to a member to be capped; a cylindrical barrel secured to the inner side of said inner cap, coaxial therewith; a guide ring mounted in said barrel and provided with diametrically opposed bores extending therethrough parallel to the axis of said barrel; an outer cap enclosing the inner cap and rotatably mounted thereon; said caps having respective pairs of diametrically opposed ports adapted to be registered with each other by relative rotation between the caps; a lock tumbler cylinder secured to said inner cap and projecting axially into said guide ring; a lock tumbler core rotatably mounted within and extending axially through said cylinder and having tumbler means coacting therewith for locking the core to the cylinder; a head secured to the inner end of said core and having diametrically opposed radially extending camming fingers; a clutch ring axially slidable in said barrel from a position abutting said guide ring to a position axially separated therefrom; end abutment means carried by the inner end of said barrel; a spring interposed under load between said end abutment means and said clutch ring and urging the latter toward abutment with said guide ring; a pair of clutch pins axially slidable in the respective bores, said pins having inner ends secured to said clutch ring and outer ends adapted to extend through respective ports when the latter are registered, thereby to clutch said outer cap to said inner cap assembly; and diametrically opposed camming ramps at the inner margin of said clutch ring, said ramps coacting with respective fingers of said head to cause said clutch ring to move away from said guide ring when said tumbler core is rotated, thereby to withdraw said clutch pins from the apertures of said outer cap and free said outer cap for rotation relative to said inner cap.

6. In a locking cap of the type described: an inner cap assembly including an inner cap having means operable, upon rotation thereof, to secure the same to a member to be capped; a cylindrical barrel secured to the inner side of said inner cap, coaxial therewith; a tubular guide ring mounted within said barrel, with its outer wall fitted to the inner wall of said barrel, said guide ring being provided with a pair of diametrically opposed bores extending therethrough parallel to the axis of said barrel; a lock tumbler cylinder having an outer end portion projecting through and beyond said inner cap and secured thereto, and having an inner portion extending axially into said guide ring; an outer cap enclosing the inner cap and having a central portion defining an opening receiving said projecting outer end portion of said tumbler cylinder and rotatably mounted thereon; said caps having respective pairs of diametrically opposed parts adapted to be registered with each other by relative rotation between the caps; a lock tumbler core rotatably mounted within said tumbler cylinder and having tumbler means coacting therewith for locking the core to the cylinder; a head secured to the inner end of said core and having diametrically opposed radially projecting camming fingers; a clutch ring having its outer wall fitted to and slidably bearing against the inner wall of said barrel, said clutch ring being shiftable from a position abutting the inner end of said guide ring to a position axially separated therefrom; an end cap secured to the inner end of said barrel and cooperating therewith and with said inner cap to provide a sealed casing for the parts within said barrel; a coil spring interposed under load between said end cap and said clutch ring and urging the latter toward abutment with said guide ring, said clutch ring having a counterbore in which the adjacent end of said coil spring is piloted; a pair of clutch pins axially slidable in the respective bores, each having an inner end secured to said clutch ring and an outer end permanently received in a respective port of the inner cap and adapted to register with a respective port of the outer cap when the latter is rotated to an unlocking position; and diametrically opposed camming ramps formed in the inner margin of said clutch ring, coacting with said camming fingers to cause said clutch ring to move away from said guide ring when said tumbler core is rotated, thereby to withdraw said clutch pins from the apertures of said outer cap and thus free said outer cap for rotation relative to said inner cap.

7. In a locking cap of the type described: an inner cap assembly including an inner cap having means operable, upon rotation thereof, to secure the same to a member to be capped; a cylindrical barrel secured to the inner side of said inner cap, coaxialy therewith; a tubular guide ring mounted within said barrel, with its outer wall fitted to the inner wall of said barrel, said guide ring being provided with a pair of diametrically opposed bores extending therethrough parallel to the axis of said barrel; a lock tumbler cylinder having an outer end portion projecting through and beyond said inner cap and secured thereto, and having an inner portion extending axially into said guide ring; an outer cap enclosing the inner cap and having a central portion defining an opening receiving said projecting outer end portion of said tumbler cylinder and rotatably mounted thereon; said caps having respective pairs of diametrically opposed ports adapted to be registered with each other by relative rotation between the caps; a lock tumbler core rotatably mounted within said tumbler cylinder and having tumbler means coacting therewith for locking the core to the cylinder; a head secured to the inner end of said core and having diametrically opposed radially projecting camming fingers; a clutch ring having its outer wall fitted to and slidably bearing against the inner wall of said barrel, said clutch ring being shiftable from a position abutting the inner end of said guide ring to a position axially separated therefrom; an end cap secured to the inner end of said barrel and cooperating therewith and with said inner cap to provide a sealed casing for the parts within said barrel; a coil spring interposed under load between said end cap and said clutch ring and urging the latter toward abutment with said guide ring; a pair of clutch pins axially slidable in the respective bores, each having an inner end secured to said clutch ring and an outer end permanently received in a respective port of the inner cap and adapted to register with a respective port of the outer cap when the latter is rotated to an unlocking position; and diametrically opposed camming ramps formed in the inner margin of said clutch ring, coacting with said camming fingers to cause said clutch ring to move away from said guide ring when said tumbler core is rotated, thereby to withdraw said clutch pins from the apertures of said outer cap and thus free said outer cap for rotation relative to said inner cap.

8. A locking cap as defined in claim 7, wherein said clutch ring has a top face normal to said barrel axis and has a diametrically extending cross groove opening into said top face and receiving said camming fingers when said tumbler core is in a locking position, said ramps having bottom ends merging with the bottom of said cross groove, and having top ends merging with said top face, said camming fingers being adapted to ride from said camming ramps onto said top face and to rest thereon for holding the clutch pins in their withdrawn positions, said locking cap being thereby locked with the outer cap freely rotatable relative to the inner cap.

EMIL PRICE.

References Cited in the file of this patent

UNITED STATES PATENTS

| Number | Name | Date |
|---|---|---|
| 1,701,816 | Malluk et al. | Feb. 12, 1929 |
| 1,989,979 | Greenberg | Feb. 5, 1935 |

FOREIGN PATENTS

| Number | Country | Date |
|---|---|---|
| 757,683 | France | Oct. 16, 1933 |